United States Patent
Duck, Edward William et al.

[15] 3,676,409
[45] July 11, 1972

[54] CO-AND TERPOLYMERS OF ALPHA OLEFINS WITH CYCLO PROPANE DERIVATIVES

[72] Inventors: Edward William Duck; Brian John Ridgewell, both of Southampton; John Michael Locke, Lyndhurst, all of England

[73] Assignee: The International Synthetic Rubber Company Limited, Southampton, England

[22] Filed: Dec. 13, 1968

[21] Appl. No.: 783,726

[30] Foreign Application Priority Data

Dec. 21, 1967 Great Britain.....................58,132/67
Oct. 16, 1968 Great Britain.....................49,100/68

[52] U.S. Cl..................260/80.78, 260/87.5 C, 260/78.5 B
[51] Int. Cl.......................................................C08f 15/40
[58] Field of Search..................260/88.2 D, 88.2 E, 87.5 C, 260/87.5 R, 80.78

[56] References Cited

UNITED STATES PATENTS

| | | | |
|---|---|---|---|
| 3,131,169 | 4/1964 | Norton | 260/88.2 |
| 3,222,330 | 12/1965 | Nyce | 260/80.5 |
| 3,285,889 | 11/1966 | Arnold | 260/80.5 |
| 3,497,483 | 2/1970 | Ketley | 260/79.5 |
| 3,044,999 | 7/1962 | Tousignant | 260/91.5 |
| 3,369,012 | 2/1968 | Lundberg | 260/94.7 |
| 3,376,278 | 4/1968 | Morgan | 260/93.7 |

*Primary Examiner*—Joseph L. Schofer
*Assistant Examiner*—Roger S. Benjamin
*Attorney*—Cushman, Darby & Cushman

[57] ABSTRACT

Novel co- and ter-polymers of I-olefins are obtained by polymerizing at least one I-olefin with a novel adduct containing at least two ethylenically unsaturated linkages of a. a carbene of formula: CXY where X and Y are each hydrogen, halogen or an organic radical and either b. a polyene of the general formula

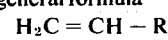

where R is a monovalent hydrocarbon group containing at least two ethylenically unsaturated linkages and having at least five carbon atoms not more than two unsaturated linkages of the polyene being conjugated.

or c. a polyene of the general formula

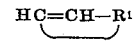

where R' is a divalent hydrocarbon group containing at least two ethylenically unsaturated linkages and having at least five carbon atoms, not more than two unsaturated linkages of the polyene being conjugated.

7 Claims, No Drawings

CO- AND TERPOLYMERS OF ALPHA OLEFINS WITH CYCLO PROPANE DERIVATIVES

This application relates to cyclopropyl derivatives, to a process for preparing them and to their use as comonomers in the polymerization and co-polymerization of 1-olefins to products which are sulphur vulcanizable.

According to the present invention there is provided an adduct containing at least two ethylenically unsaturated linkages of a. a carbene of formula: CXY where X and Y are each hydrogen, halogen or an organic radical and
b. a polyene of the general formula $$H_2C = CH - R$$

where R is a monovalent hydrocarbon group containing at least two ethylenically unsaturated linkages and having at least five carbon atoms, not more than two unsaturated linkages of the polyene being conjugated.

Also according to the present invention are adducts containing at least two ethylenically unsaturated linkages of
a. a carbene of the type specified above and
b. a polyene of the general formula

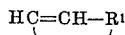

where $R^1$ is a divalent hydrocarbon group containing at least two ethylenically unsaturated linkages and having at least five carbon atoms, not more than two unsaturated linkages of the polyene being conjugated.

Also according to the present invention novel co- and terpolymers are prepared from one or more 1-olefins and at least one of the adducts mentioned above.

The invention also includes processes for the preparation of co- and terpolymers of 1-olefins with at least one such adduct.

The terms terpolymerize and terpolymers in this specification shall be understood to include the preparation of multipolymers where more than two 1-olefins are polymerized with the adduct(s). Likewise the terms co-polymerize and co-polymers are intended to include the cases wherein one or more 1-olefin(s) is or are polymerized with the adduct(s).

Preferred carbenes are those wherein X and Y in (a) above are each hydrogen, chlorine or bromine, the most preferred being :CCl₂ and :CHCl. However other carbenes are also useful, for example, those where at least one of X and Y is an alkyl radical, e.g. one having up to six carbon atoms, such as butyl, or an aryl radical, or an organic acid radical e.g. an acetate radical. The production of such carbenes and their addition to olefinic linkages is set out, for example, in "Organic Chemistry", D.J. Cram and G.S. Hammond, McGraw-Hill, Inc. second edition, in U.S. Pat. No. 2,950,328, by R.C. Woodworth and P.S. Skell in J. Am. Chem. Soc., 79, 2542 (1957) and in "Carbene Chemistry" W. Kirmse, Academic Press 1964.

Preferred adducts are those prepared from polyenes wherein R in the formula above is a straight chain aliphatic group e.g. 5 methyl 1,3,7-heptatriene, 1,3,7-octatriene and especially from those polyenes containing no conjugated unsaturated linkages e.g. 1,4,7-octatriene, 1,4,9-decatriene and 1,5,9-decatriene. Adducts prepared from 1,4,9-decatriene especially the 4,5 adduct, are particularly preferred. Adducts prepared from polyenes having four or more unsaturated linkages in the molecule are also within the scope of the invention, for example those prepared from 1,4,6,9,12-tridecapentaene. An example of a cyclic polyene is 1,5,9 cyclododecatriene wherein $R^1$ in the formula above is —(CH₂)₂ CH:CH (CH₂)₂ CH:CH (CH₂)₂ —.

The adducts of the invention are prepared by a process which comprises reacting the polyene with the carbene in a solvent. For best use polar solvents should be used, for example, those having polarities greater than tertiary butanol. Where tertiary butanol is employed as the solvent, only a limited yield of adduct is obtained. The choice of solvent is restricted by the requirement that it must not be attacked by any of the reagents present in the adduct forming reaction. It has been found that aliphatic polyethers such as glyme and diglyme are very satisfactory.

The adducts of the invention are of especial value as termonomers in the co-polymerization of 1-olefins whereby a sufficient degree of unsaturation is obtained in the resulting terpolymer to enable conventional rubber vulcanization techniques (e.g. the use of sulphur based recipes) to be employed. When used for this purpose, the adducts are preferably liquids and accordingly should generally have not more than 16 carbon atoms in the chain. The amount of adduct used may be from 1 to 80 percent by weight but in the case of terpolymers is generally from 1 to 20 percent preferably from 3 to 10 percent by weight based on the weight of total monomers. A mixture of adducts may be used if desired.

When used as termonomers, it is very desirable that the adducts should not be contaminated with material containing conjugated double bonds. In preparing an adduct from a polyene containing a pair of conjugated double bonds, the carbene normally adds preferentially to these, but traces of material having conjugated double bonds may remain in the resulting product. If these are not removed before use of the product in the polymerization reaction with 1-olefins, the polymerization catalyst is liable to be poisoned. Accordingly if any material is present in the adduct product, containing conjugated double bonds (the presence of which may be detected in the infra red or ultra violet spectra) bromine may suitably be added, for example in quantities of less than 10 mole percent based on the total adduct.

As well as enabling a sufficient degree of unsaturation to be obtained in co- and ter-polymers, the use of adducts according to the invention greatly reduces or substantially eliminates the formation of insoluble gel.

A satisfactory catalyst system which may be used for the preparation of copolymers and terpolymers according to the invention comprises:

a. a hydrocarbon soluble compound of vanadium, titanium or zirconium in which a halogen is not directly attached to metal; or a hydrocarbon soluble compound of vanadium, in which halogen is directly attached to the metal, of general formula $$VOX_{3-n}(OR)_n$$

where $n$ is 0, 1 or 2
X is halogen
R is an alkyl, aryl or aralkyl residue.

b. an aluminum trihalide or dihalohydride, preferably containing bromine and/or iodine; a hydrocarbon soluble adduct of aluminum trichloride with an ether, thio-ether, cyanide or tertiary amine; and c. an organometallic compound of lithium.

Such catalyst systems are described in, for example, British Patent Specification Nos. 1,077,397, 1,113,898 and British Patent Application No. 33661/67.

The molar ratio between component (b) and component (a) may suitably be from 5:1–100:1 preferably 8:1–50:1 and that between component (b) and component (c) may suitably be from 0.1:1–100:1 preferably 0.25:1–5:1.

The catalyst components may be mixed in any order in the presence or absence of monomers. If, however, the adduct of the invention is prepared from a carbene containing halogen, component (c), the lithium compound, should not be mixed with it in the absence of the other monomer(s) or the other catalyst components.

Polymerization is preferably but not essentially, carried out in an inert hydrocarbon solvent such as hexane, heptane, iso octane or cyclohexane. Solvent may however be omitted and polymerization carried out in the liquified monomer(s) as solvent.

Polymerization may suitably be carried out in the temperature range −15° to +30°C, and at pressures suitably ranging from atmospheric pressure to 50 atmospheres above atmospheric.

Co- and terpolymers may also be prepared using other coordination catalysts such as those of the so called Ziegler Natta type comprising, for example, vanadium oxytrichloride with aluminum sesquichloride or vanadium tetrachloride with aluminum diethyl chloride.

It will be found however that certain of the adducts are more easily incorporated with one particular catalyst system than with another. The expert will readily be able to determine which system is the most effective for any particular adduct.

The molecular weights of the products may be calculated from the Intrinsic (Dilute Solution) viscosity (I.V. or D.S.V.), $\eta$, by using the mark Houwink equation:

$$\eta = K M_v^{\alpha}$$

where
$K = 7.24 \times 10^{-4}$
$\alpha = 0.64$ $M_v$ = the viscosity average molecular weight.
The following examples illustrate the invention.

EXAMPLE 1

This example illustrates the preparation of the adducts. In this case, the dichlorocarbene adduct of 1,4,9-decatriene is prepared.

A flask fitted with a stirrer, condenser and a nitrogen gas inlet is charged firstly with 400 ml. glyme or diglyme as solvent, 272 g. 1,4,9-decatriene (2.0 moles) of at least 97.7 percent purity and 160 g. flake or pellet sodium hydroxide (4.0 moles) and then 120 g. chloroform (1.0 mole) substantially free from ethanol is added. The reaction mixture is maintained at 60°C for 18 hours (overnight) during which time it becomes dark brown in color. 300 ml water is added and the mixture stirred until the solid sodium hydroxide and sodium chloride is dissolved. The organic and aqueous layers are separated, the latter is extracted with pentane and the extract added to the organic layer. The organic layer is then dried over sodium sulphate, filtered through a pad of alumina and distilled under vacuum. Pentane is distilled off first, followed by the glyme or diglyme solvent with unreacted 1,4,9-decatriene and then the monocarbene adducts. Of the latter the first to distil over is the 4,5-dichlorocarbene adduct followed by the 1,2 - and 9,10-dichlorocarbene adducts. A mixture of the dichlorocarbene adducts is obtained, boiling at 70° to 90°C at 0.5 mm. Hg. Yield 65-70 percent.

The products from this reaction are most effectively analyzed using gas liquid chromatography.

The 4,5 adduct can be separated from the others by means of a Perkin Elmer Model F11 Gas Liquid Chromatograph using diethylene glycol succinate as the stationary phase in a 6 foot column at 160°C with nitrogen at 20 p.s.i. pressure as carrier. The three mono adducts may be resolved under these conditions, the 1,2 and 9,10 peaks being very close together. The bis and tris adducts have a much longer retention time.

The separated isomers may be collected in trace quantities at the detector exhaust and may be examined using infra-red spectroscopy. The spectrum of the 4,5 adduct shows a strong absorption at 805 cm$^{-1}$, no absorption at 970 cm$^{-1}$ (corresponding to a trans double bond) being observed. The 1,2 and 9,10 adducts give a strong band at 750 cm$^{-1}$.

The 4,5 adduct may also be separated by distillation under vacuum preferably using a Nester and Faust spinning band column. The boiling points of the mono adducts are 71°C for the 4,5 adduct and 79°C for the other two at 0.3 mm of mercury pressure.

A quantity of bis and tris carbene adducts is formed in the reaction and this is kept low by using excess 1,4,9-decatriene over the chloroform, e.g. at least 0.5 mole excess over stoichiometric amounts.

The yield is improved by use of the excess of sodium hydroxide over the chloroform, due both to improved production of the required dichlorocarbene and to some losses of sodium hydroxide in inevitable side reactions. For instance if 2.0 moles of sodium hydroxide are used in the above example in place of the 4.0 described, the yield is approximately 5 percent lower.

EXAMPLE 2

500 ml. pure, dry normal hexane was added to a 700 ml. flanged polymerization type glass flask under a purified nitrogen blanket. The solution was saturated at 0°C with a gaseous mixture of ethylene and propylene (molar and volume ratio E:P = 2:1) containing 0.1 percent, v/v on total gaseous monomers, of hydrogen as molecular weight modifier. Monomer flow was 1,000 ml. min$^{-1}$ for 1 hour and a high speed stirrer (980 rpm) was used.

At the end of 1 hour the flask was sealed to a constant pressure of one-fourth psig and the apparatus was arranged so that when the pressure fell slightly as a result of polymerization, the head of pressure was restored with a gaseous mixture consisting of 65/35 ethylene/propylene (molar and volume ratio) and containing 0.1 percent, v/v on total gaseous monomers, of hydrogen. In this way the concentration of monomers dissolved in the solvent could be maintained at the correct level (which had been established by the one hour saturation period) throughout the reaction time.

The catalyst components were then added in rapid succession as dilute solutions in cyclohexane; vanadium oxytrichloride (0.125 m. mole, 2 ml. solution) aluminum tribromide (2.5 m. mole 4.65 ml solution) and lithium butyl (3.75 m. mole, 3.75 ml. solution). Thus V : Al : Li = 1:20:30.

Addition of the carbene 1,2 adduct of 1,5,9-decatriene (5 g.) was then commenced. This was added continuously from a burette during the polymerization as a dilute solution in n-hexane.

After 1 hour the polymerization was stopped by the addition of methanol (5 ml.). The solution was very viscous but the polymer remained completely soluble in the reaction medium. A small quantity (ca. 0. 1 g.) of "FLECTOL H" antioxidant — FLECTOL (polymerized 2,2,4-trimethyl-1,2-dihydroquinoline) is a Trademark of Monsanto Chemicals Ltd.—in 10 ml. hexane was added and the solution was well stirred. The contents of the flask was poured into acetone and the rubber was recovered. The yield, percent of ethylene content ( as determined by infra-red spectroscopy using the method of P.J. Cornish and M.E. Tunnicliffe (Journal of Polymer Science part C, 1962, No. 7 pgs. 182–202), the intrinsic viscosity-(IV.)-measured as a 0.1 percent w/w solution in cyclohexane at 30°C are given in the table.

| Yield | Moles % $C_2H_4$ | I.V. |
|---|---|---|
| 15 gms. | 68 | 1.5 |

Samples of the polymer were cured using a conventional sulphur based vulcanization recipe to give a rubber of good physical properties. The degree of cure obtained was good.

EXAMPLE 3

Example 2 was repeated except that 5 g. of the dichlorocarbene 1,2 adduct of 1,5,9-decatriene was used. The results obtained are given in the table

| Yield | Moles % $C_2H_4$ | I.V. | % Cl w/w |
|---|---|---|---|
| 12 gms. | 65 | 2.0 | 1.51 |

In this case a check on the chlorine content of the polymer was made to give an indication of the degree of incorporation of the termonomer.

Samples of the polymer were vulcanized as before to give a good degree of cure. The product was a rubber with good physical properties.

EXAMPLE 4

The procedure of Example 2 was repeated except that
1. The transition metal compound was tri-n-butyl vanadate (0.125 m. mole)
2. The proportion of hydrogen was increased from 0.1 percent v/v on total gaseous monomers to 0.2 percent v/v during both saturation and polymerization.

3. The termonomer used consisted of the mixed adduct obtained from the reaction described in Example 1. The mixture contained approximately 50 percent of the 4,5 adduct, 1,1 dichloro, 2-(n propenyl-2), 3-(n pentenyl-4) cyclopropane, 25 percent of the 1,2 adduct, 1,1 dichloro 2-(n octadienyl-4,7) cyclopropane and 25 percent of the 9,10 adduct 1,1 dichloro, 2 (n octadienyl-2,7) cyclopropane. All the termonomer (4.8) g. was added at the beginning of the polymerization period. 13 g. of polymer of D.S.V. 2.4 with an E/P molar ratio of 72/28 was obtained. The Wijs iodine number was 6.8. When used in a standard sulphur containing recipe, the polymer could be vulcanized at 160°C in 30 minutes using a Wallace Shawbury Curometer.

EXAMPLES 5–7

The procedure of Example 2 was repeated except that
1. The proportion of hydrogen was increased as described in Example 4.
2. The termonomer used was that mixture described in Example 4. All the termonomer was added at the beginning of the polymerization period. The amounts of termonomer used and the results obtained are given in the table.

EXAMPLE 8

The procedure of Example 2 was repeated except that the catalyst used was $VOCl_3$/Aluminum trichloride-anisole 1:1 adduct dissolved in chlorobenzene hexane 50:50 solvent/LiBu in amounts of 0.5/5/7.5 m.mole per liter of solvent, the E/P ratio during saturation and polymerization was 1:3 and the termonomer used was the mixture described in Example 4. All the termonomer was added at the beginning of the polymerization. The amount used and the results obtained are given in the table.

EXAMPLE 9

The procedure of Example 2 was used except that the catalyst used was tetra-n-butyl titanate/Aluminum tribromide/Lithium butyl in molar amounts of 0.25/5/10 per 500 ml of solvent and the temperature of saturation and polymerization was 20°C instead of 0°C. The E/P ratio during saturation and polymerization was 1:2 and no hydrogen was used. The termonomer described in Example 4 was used in an amount of 4 gms. The results are quoted in the table.

EXAMPLES 10–13

The termonomer described in Example 4 (the mixed adduct) was carefully distilled and separated into two fractions:
Fraction A was substantially pure 4,5 adduct
Fraction B was an approximately 50/50 mixture of 1,2 adduct and 9,10 adduct.
These fractions were used separately as termonomers in polymerizations using the conditions described in Example 2 except that the proportion of hydrogen was increased from 0.1 to 0.2 percent w/w as in Example 4. The amounts of termonomer used and the results obtained are given in the table. Fraction A was used in Examples 10 and 11 and Fraction B in Examples 12 and 13.

| Ex. | Wt. of termonomer gms. | yield | E/P molar ratio of polymer | D.S.V. | $I_2$ No. | % Cl | Cure Time 160° mins |
|---|---|---|---|---|---|---|---|
| 5 | 1 | 14.1 | 66/34 | 2.7 | 3.8 | 0.9 | 50 |
| 6 | 2 | 11.3 | 74/26 | 2.2 | 4.8 | 1.4 | 45 |
| 7 | 5 | 12.0 | 67/33 | 2.9 | 7.5 | — | 25 |
| 8 | 4 | 8.7 | 64/36 | 3.3 | 5.1 | — | 37 |
| 9 | 1 | 6.1 | 73/27 | 2.3 | 4.1 | — | 50 |
| 10 | 3 | 13 | 61/39 | 2.5 | 7.4 | — | 22 |
| 11 | 4 | 28 | 68/32 | 4.7 | 7.0 | — | 30 |
| 12 | 3 | 18.2 | 60/40 | 2.2 | 6.3 | — | 33 |
| 13 | 4 | 18 | 63/37 | 2.8 | 7.3 | — | 25 |

EXAMPLE 14

A large scale trial was run in a batch overflow reactor using the termonomer described in Example 4. The catalyst used was $VOCl_3$/$AlBr_3$/BuLi in amounts of 0.2/2/2 m.moles per liter of solvent. The solvent used was a mixture of hexanes. Hydrogen was used in amounts of 0.2 percent v/v on an ethylene/propylene feedstream (ratio 65:35). The temperature of polymerization was 0° ± 5°C. At steady state the contents assumed a 7 percent solids level at which the conversions were ethylene 81 percent, propylene 20 percent, termonomer 88 percent. The rubber produced was completely soluble and, on isolation, it was found to have a D.S.V. of 1.6, a Mooney viscosity $ML_{1+4}{}^{100°C}$ 46, an E/P ratio of 62/38 and an iodine number of 9.1.

Using a standard sulphur containing recipe, the cure time Wallace Shawbury Curometer) was 18 minutes at 160°C. A tensile pad prepared to British Standard Specification No. 903 had a tensile strength of 2,700 p.s.i. and an elongation at break of 450 percent.

EXAMPLE 15

The termonomer described in Example 4 was used in the procedure of Example 2 except that ethylene was used alone as co-monomer and the hydrogen level was 0.2 percent w/w as in Example 4.

The product (33 g.) was a white powdery, insoluble polymer which even after repeated extraction with acetone contained 2.7 percent chlorine. It was therefore a copolymer of the two monomers.

EXAMPLE 16

The procedure described in Example 15 was used except that propylene was used in place of ethylene.

A yield of 5.3 g. rubbery soluble material was obtained. Even after repeated extractions with acetone it contained 1.7 percent chlorine by weight.

EXAMPLE 17

(for comparison)

The procedure of Example 2 was repeated except that
1. the proportion of hydrogen was increased as in Example 4.
2. the termonomer used was 1,4,9-decatriene in an amount of 3 g.

Insoluble polymer started to form soon after the onset of reaction and at the end of 1 hour the rubber (yield 6 g.) was over 70 percent gelled. The iodine number of the residual soluble rubber was approximately 4.2 and the E/P molar ratio was 63/37.

The gelled rubber was extremely difficult to process but a suitable sample used in the standard sulphur containing recipe could be cured to a small extent in 50 minutes at 160°C (Wallace Shawbury Curometer).

In the examples the standard sulphur containing recipe used to test the polymers in the curometer was (parts are by weight)

| Polymer | 100 |
|---|---|
| Zinc Oxide | 5 |
| Stearic Acid | 1 |
| Mercaptobenzthiazole | 1 |
| Tetramethyl thiuram disulphide | 1 |
| Sulphur | 2 |

What we claim is:

1. A sulfur vulcanizable copolymer prepared from at least one 1-olefin selected from the group consisting of ethylene and propylene and an adduct containing at least two ethylenically unsaturated linkage of
   a. a carbene of the formula CXY where X and Y are halogen; and b. a polyene of the general formula $CH_2 = CHR$, where R is a monovalent straight chain aliphatic hydrocarbon group containing at least two ethylenically unsaturated linkages and having at least five carbon atoms and containing no conjugate unsaturated linkages, the amount of adduct being from 1 to 20 percent by weight based on the total weight of constituent monomers.

2. A copolymer according to claim 1 wherein the polyene is 1, 4, 7-octatriene, 1,5,9-decatriene or 1,4,9-decatriene.

3. A copolymer according to claim 1 prepared from an adduct of a carbene wherein X and Y are each, chlorine or bromine.

4. A copolymer according to claim 1 wherein the polyene used is 1,4,7-octatriene or 1,5,9-decatriene.

5. A copolymer according to claim 1 wherein the polyene used is 1,4,9-decatriene.

6. A copolymer according to claim 1 wherein the amount of adduct is from 3 to 10 percent by weight based on the total weight of constituent monomers.

7. A sulfur vulcanizable copolymer of ethylene-propylene and an adduct containing at least two ethylenically unsaturated linkages of a dichloro carbene and 1,4,9-decatriene, the amount of adduct being from one to 20 percent by weight based on the total weight of constituent monomers.

* * * * *